United States Patent
Ma et al.

(10) Patent No.: US 7,742,509 B2
(45) Date of Patent: Jun. 22, 2010

(54) SINGLE-LONGITUDINAL MODE LASER WITH ORTHOGONAL-POLARIZATION TRAVELING-WAVE MODE

(75) Inventors: Yingjun Ma, Fujian (CN); Shijie Gu, Sunnyvale, CA (US); Li Wu, Fujian (CN); Hehui Wu, Fujian (CN); Weimin Chen, Fujian (CN); Yanli Wang, Fujian (CN)

(73) Assignee: Photop Technologies, Fuzhou (CN)

( * ) Notice: Subject to any disclaimer, the term of this patent is extended or adjusted under 35 U.S.C. 154(b) by 161 days.

(21) Appl. No.: 12/237,735

(22) Filed: Sep. 25, 2008

(65) Prior Publication Data

US 2010/0074280 A1    Mar. 25, 2010

(51) Int. Cl.
*H01S 3/098* (2006.01)
*H01S 3/08* (2006.01)

(52) U.S. Cl. .................................. 372/19; 372/106
(58) Field of Classification Search .................. 372/106
See application file for complete search history.

(56) References Cited

U.S. PATENT DOCUMENTS

| | | | |
|---|---|---|---|
| 5,164,954 A | 11/1992 | Su | |
| 5,381,437 A * | 1/1995 | Kuwabara et al. | 372/106 |
| 5,412,673 A | 5/1995 | Caprara | |
| 5,657,341 A | 8/1997 | Hyuga | |
| RE35,962 E | 11/1998 | Ball | |
| 6,047,014 A * | 4/2000 | Hyuga et al. | 372/108 |
| 6,584,129 B2 | 6/2003 | Hyuga | |
| 7,382,812 B2 | 6/2008 | Irikuchi | |
| 2002/0061037 A1 * | 5/2002 | Schmid et al. | 372/106 |

* cited by examiner

*Primary Examiner*—Minsun Harvey
*Assistant Examiner*—Sean Hagan
(74) *Attorney, Agent, or Firm*—Xin Wen

(57) ABSTRACT

A single longitudinal-mode laser includes a first mirror and a second mirror that define a laser cavity therein that does not include a linear polarizer. A birefringent gain medium can generate a lasing light at a lasing wavelength along a light propagation direction in response to a pump light at a pumping wavelength. The birefringent gain medium has an optical axis substantially perpendicular to the light propagation direction. A first wave plate positioned between the first mirror and the birefringent gain medium is a quarter wave plate at the lasing wavelength and a whole wave plate at the pumping wavelength. A second wave plate is positioned between the birefringent gain medium and the second mirror. The first wave plat and the second wave plate in part produce a single longitudinal mode in the lasing light.

23 Claims, 5 Drawing Sheets

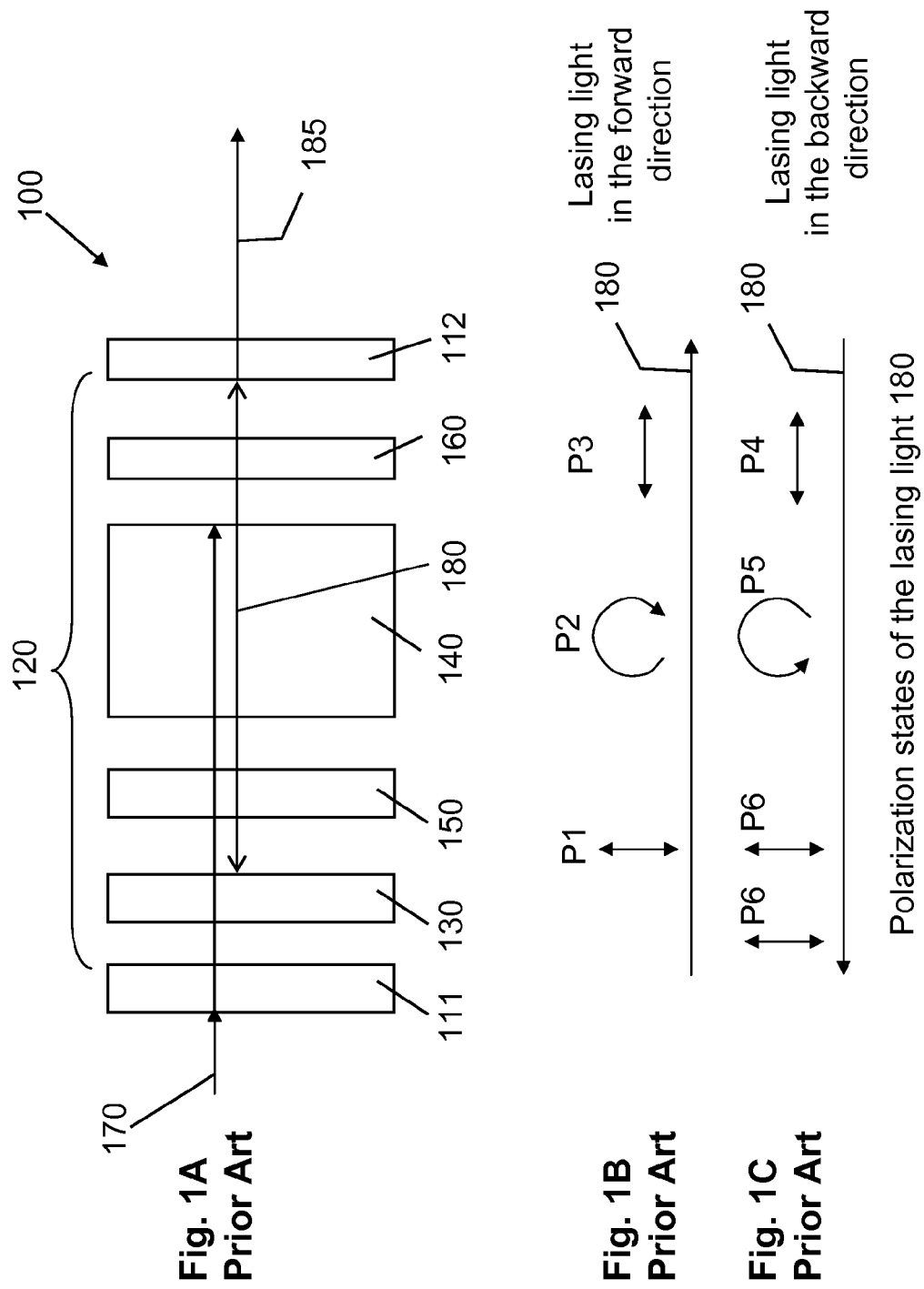

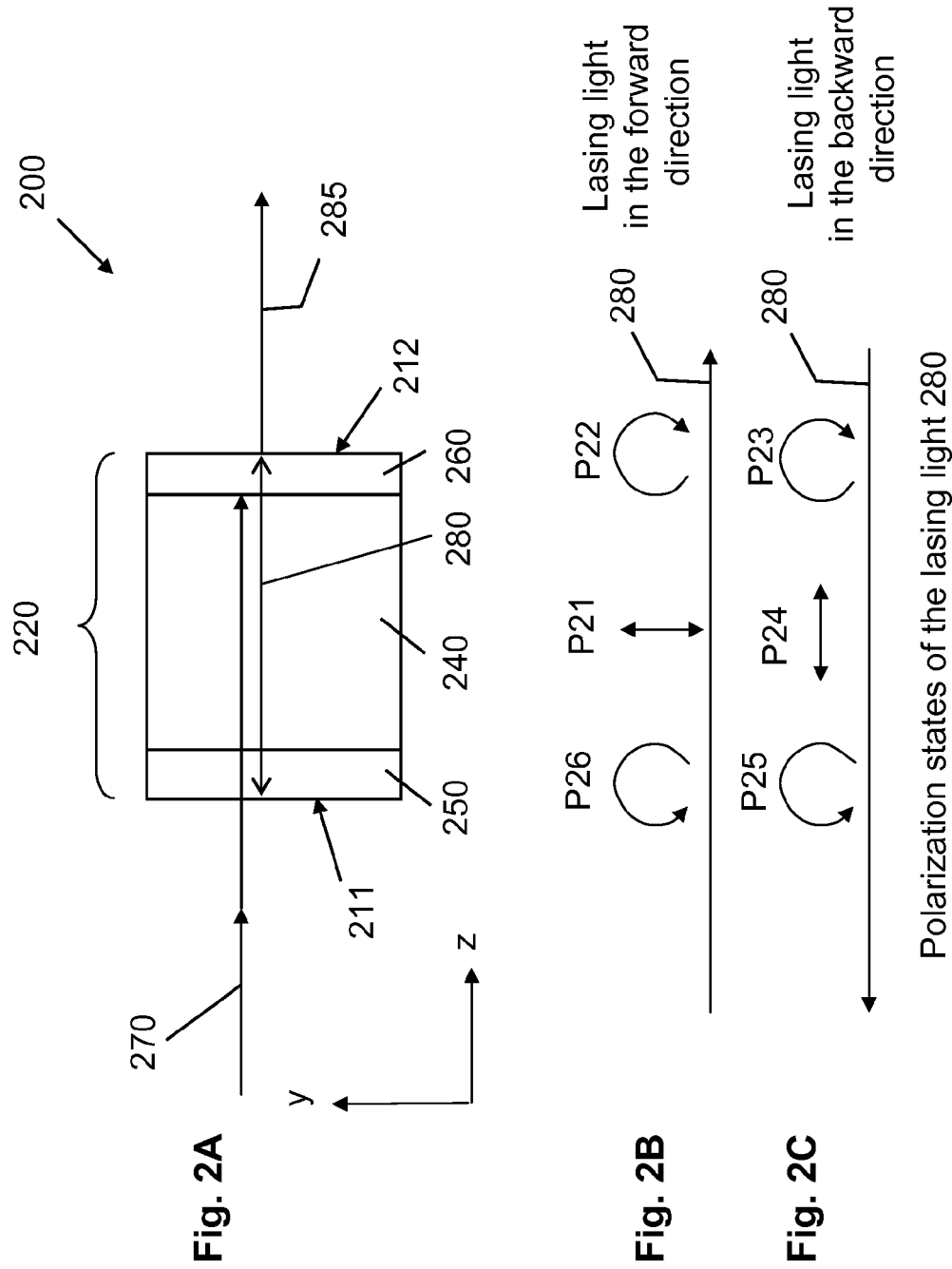

SINGLE-LONGITUDINAL MODE LASER WITH ORTHOGONAL-POLARIZATION TRAVELING-WAVE MODE

BACKGROUND

The present disclosure relates to single-longitudinal mode laser devices.

Single-longitudinal mode (SLM) laser is an essential laser device in a wide range of applications from stable operation of intra-cavity frequency doubling, precision measurement, high-resolution spectroscopy, coherent lidars, coherent optical communication, to laser trapping or cooling. As already known, in the common standing-wave lasers, and especially homogeneously broadened solid-state lasers, spatial hole-burning in active gain materials usually causes multimode laser operation. Various techniques have been attempted to obtain SLM laser operation.

One conventional SLM laser includes twisted mode in the laser cavity. Referring to FIG. 1A, a conventional SLM laser 100 can include a pair of mirrors 111, 112 that define a laser cavity 120, a linear polarizer 130, a gain medium 140, a quarter wave plate 150, and a quarter wave plate 160 in the laser cavity 120. A pump light 170 is transmitted into the laser cavity 120. A lasing light 180 is generated by the gain medium 140 in response to the pump light 170. The mirror 111 is totally reflective to the lasing light 180 while the mirror 112 is semi reflective and semi-transmissive. The lasing light 180 is reflected by the mirrors 111, 112 to establish a standing wave in the laser cavity. In the forward pass as shown in FIG. 1B, the linear polarizer 130 polarizes the lasing light 180 in a linear direction (P1). The quarter wave plate 150 transfers the linearly polarized lasing light (P1) to a circularly polarized lasing light (P2) that enters the gain medium 140. The gain medium is required to be isotropic, which can maintain the circular polarization (P2) along the forward pass. The quarter wave plate 160 returns the circular polarization (P2) into a linear polarization (P3). The linear polarization (P4) is maintained after the reflection by the mirror 112. The quarter wave plate 160 produces another circularly polarized light with a circular polarization (P5) that is opposite to the circular polarization P2 in the forward direction. The quarter wave plate 150 then returns circular polarization (P5) to another linearly polarized (P6) lasing light, which is parallel to the polarization axis of the linear polarizer 130. The linear polarization (P6) is maintained after the lasing light is reflected by the mirror 111 and passes the linear polarizer 130 in the next forward pass. A portion of the lasing light 180 can transmit through the mirror 112 to form an output laser light 185.

Because the gain medium 140 is isotropic, the circularly polarized lasing light 180 in the forward and the backward direction have the same intensity as well as the same frequency. The oppositely circularly polarized lasing light 180 in the forward and the backward directions can prevent the formation of a standing wave, which suppresses hole burning effect and enables a single longitudinal mode in the laser cavity 120. A limitation of the SLM laser 100, however, is that the gain medium is required to be an isotropic material in order to produce a single longitudinal mode.

In another attempt, a thin gain medium crystal is positioned close to one of the mirrors in a laser cavity to produce single longitudinal mode. Since all modes have a common node at the mirror and to a large extent share the same population of ions in the vicinity of the mirror, the effect of spatial hole burning can therefore suppressed. A gain medium with short absorption depth can also be used instead of a thin gain-medium crystal. This type of lasers is expected to operate at the single-longitudinal mode when the pump power of laser diode is less than 5 times the thresholds. This approach is, however, incapable of producing high-power output r due to the size limitation of the thin gain medium. Moreover, cavity length must be selected by temperature control so that one of its resonant frequency fall within the laser gain region.

Laser operation in a ring cavity is another known technique to obtain SLM output. In this configuration, an intra-cavity optical diode keeps unidirectional laser propagation so that no standing-wave electric fields are formed in the cavity, leading to the elimination of spatial hole-burning in the active material. But this method cannot be used for microchip laser.

SUMMARY

In a general aspect, the present invention relates to a single longitudinal-mode laser, that includes a first mirror; a second mirror, wherein the first mirror and the second mirror define a laser cavity therein, wherein the first mirror can allow a pump light at a pumping wavelength to enter the laser cavity, wherein there is no linear polarizer positioned within the laser cavity; a birefringent gain medium that can generate a lasing light at a lasing wavelength along a light propagation direction in response to the pump light, wherein the birefringent gain medium has an optical axis substantially perpendicular to the light propagation direction, wherein the second mirror can output at least a portion of the lasing light out of the laser cavity to form an output laser; a first wave plate positioned between the first mirror and the birefringent gain medium, wherein the first wave plate is a quarter wave plate at the lasing wavelength and a whole wave plate at the pumping wavelength; and a second wave plate positioned between the birefringent gain medium and the second mirror, wherein the first wave plat and the second wave plate in part produce a single longitudinal mode in the lasing light.

In another general aspect, the present invention relates to a single longitudinal-mode laser which includes a first mirror; a second mirror, wherein the first mirror and the second mirror define a laser cavity therein, wherein the first mirror can allow a pump light at a pumping wavelength to enter the laser cavity, wherein there is no linear polarizer positioned within the laser cavity; a birefringent gain medium that can generate a lasing light at a lasing wavelength along a light propagation direction in response to the pump light, wherein the birefringent gain medium has an optical axis substantially perpendicular to the light propagation direction, wherein the second mirror can output at least a portion of the lasing light out of the laser cavity to form an output laser; a first wave plate positioned between the first mirror and the birefringent gain medium, wherein the first wave plate has a first fast axis substantially perpendicular to the light propagation direction, wherein the first fast axis is at a first angle relative to the optical axis of the birefringent gain medium, wherein the first angle is between 30 and 60 degrees; and a second wave plate positioned between the birefringent gain medium and the second mirror, wherein the second wave plate has a second fast axis substantially perpendicular to the light propagation direction and to the first fast axis, wherein the first wave plat and the second wave plate in part produce a single longitudinal mode in the lasing light.

In another general aspect, the present invention relates to a single longitudinal-mode laser that includes a first mirror; a second mirror, wherein the first mirror and the second mirror define a laser cavity therein, wherein the first mirror can allow a pump light at a pumping wavelength to enter the laser cavity; a first wave plate positioned between the first mirror and the birefringent gain medium, wherein the first wave plate is a quarter wave plate at a lasing wavelength and a whole wave plate at the pumping wavelength, wherein the first wave plate has a first fast axis substantially perpendicular to the light propagation direction, wherein the first fast axis is at a first angle relative to the optical axis of the birefringent gain medium, wherein the first angle is between 30 and 60 degrees; a birefringent gain medium that can generate a first linearly polarized lasing light at the lasing wavelength along a light propagation direction in response to the pump light, wherein the birefringent gain medium has an optical axis substantially perpendicular to the light propagation direction, wherein the first linearly polarized lasing light has a first linear polarization parallel to the optical axis of the birefringent gain medium; and a second wave plate positioned between the birefringent gain medium and the second mirror, wherein the second wave plate has a second fast axis substantially perpendicular to the light propagation direction and to the first fast axis, wherein the second wave plate can produce a first circularly polarized lasing light, wherein the second mirror can reflect the first circularly polarized lasing light to produce a second circularly polarized lasing light and to output at least a portion of the first circularly polarized lasing light out of the laser cavity to form an output laser, wherein the second wave plate can produce a second linearly polarized lasing light having a second linear polarization perpendicular to the optical axis of the birefringent gain medium in response to the second circularly polarized lasing light.

Implementations of the system may include one or more of the following. The first wave plate can have a first fast axis substantially perpendicular to the light propagation direction, wherein the first fast axis is at a first angle relative to the optical axis of the birefringent gain medium, wherein the first angle is between 30 and 60 degrees. The first angle can be between 40 and 50 degrees. The first wave plate can have a first slow axis substantially perpendicular to the first fast axis and the light propagation direction. The second wave plate can have a second fast axis substantially perpendicular to the light propagation direction and to the first fast axis. The second fast axis can be at a second angle relative to the optical axis of the birefringent gain medium, wherein the second angle is between 30 and 60 degrees. The second angle can be between 40 and 50 degrees. The second wave plate can have a second slow axis substantially perpendicular to the second fast axis and the light propagation direction. The birefringent gain medium can generate a first linearly polarized lasing light having a first linear polarization parallel to the optical axis of the birefringent gain medium, wherein the second wave plate can produce a first circularly polarized lasing light, wherein the second mirror can reflect the first circularly polarized lasing light to produce a second circularly polarized lasing light, wherein the second wave plate can produce a second linearly polarized lasing light having a second linear polarization perpendicular to the optical axis of the birefringent gain medium in response to the second circularly polarized lasing light. The birefringent gain medium, the first wave plate and the second wave plate can produce the lasing light in a single longitudinal mode when the pump light has a pump power between a threshold pump power and a maximum pump power that is at least 20 times of the threshold pump power. The threshold pump power can be below 50 mW, and wherein the maximum pump power is more than 1000 mW. The output laser can have a power more than 500 mW when the pump power is at about 1000 mW. The wavelength of the output laser can have a variation smaller than 0.3 nm when the pump power varies from the threshold pump power and the maximum pump power. The slope efficiency of the output laser can be more than 60%. The birefringent gain medium, the first wave plate and the second wave plate can produce the lasing light in a single longitudinal mode thereby producing the output laser having a wavelength variation less than 0.3 nm over a temperature range from 10° C. to 40° C.

The present patent application discloses improved high performance single longitudinal mode laser device. The disclosed SLM laser is compatible with birefringent gain medium materials, which allows the disclosed SLM laser to use a wide selection of laser gain medium materials than conventional SLM laser devices. The disclosed SLM laser is based on orthogonal-polarization traveling mode (OTM), which differs from the standing-wave mode laser in some conventional SLM laser devices. The disclosed SLM laser can suppress spatial hole-burning effect at laser power much higher than the threshold power, and can provide single longitudinal mode operation with high power of output and high slope efficiencies in a wide temperature range.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and form a part of the specification, illustrate embodiments of the present invention and, together with the description, serve to explain the principles of the invention.

FIG. 1A is a schematic diagram of a conventional single longitudinal-mode laser.

FIG. 1B is a schematic diagram showing the polarization states of the lasing light in a forward direction in the conventional single longitudinal-mode laser in FIG. 1A.

FIG. 1C is a schematic diagram showing the polarization states of the lasing light in a backward direction in the conventional single longitudinal-mode laser in FIG. 1A.

FIG. 2A is a schematic side view of a single longitudinal-mode laser in accordance to the present invention.

FIG. 2B is a schematic diagram showing the polarization states of the lasing light in a forward direction in the single longitudinal-mode laser in FIG. 2A.

FIG. 2C is a schematic diagram showing the polarization states of the lasing light in a backward direction in the single longitudinal-mode laser in FIG. 2A.

DETAILED DESCRIPTION

Figure 2D:
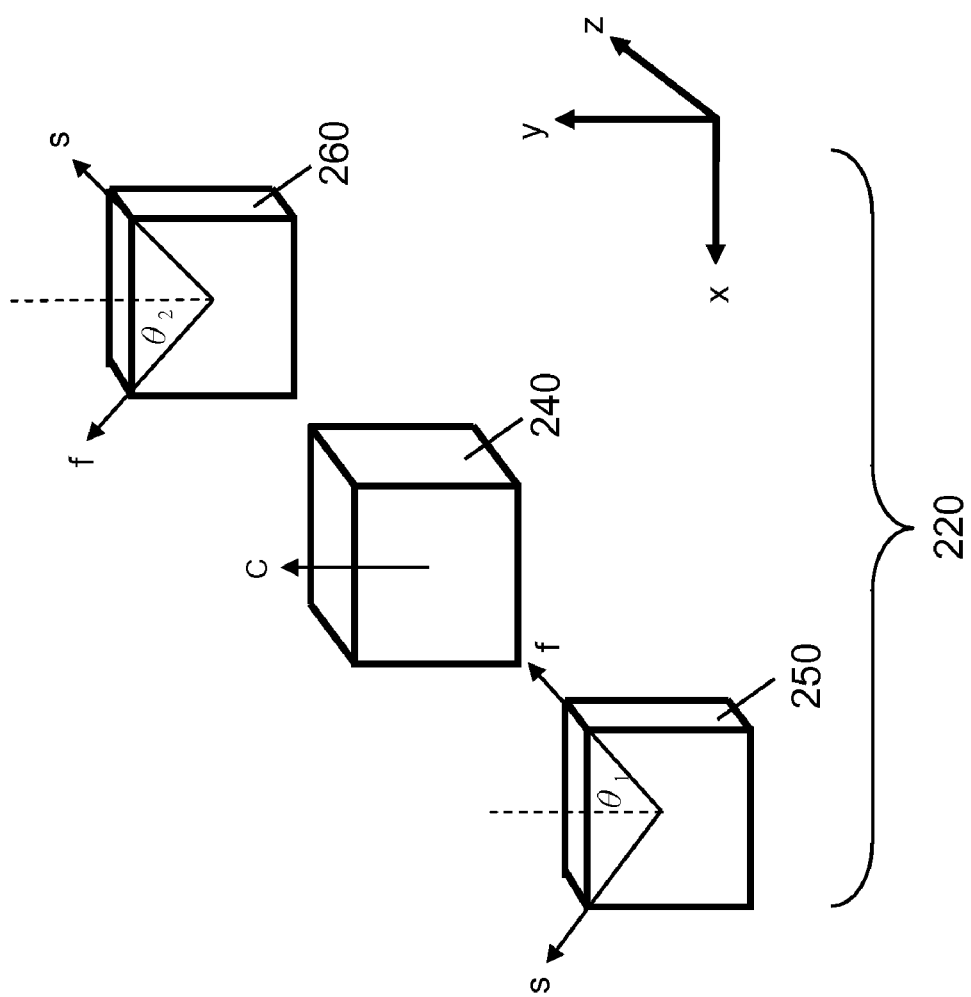
FIG. 2D is a partial perspective view of the single longitudinal-mode laser in FIG. 2A.

Referring to FIGS. 2A-2D, an exemplified SLM laser 200 includes a pair of mirrors 211, 212 that define a laser cavity 220, and a gain medium 240, a wave plate 250, and a wave plate 260 in the laser cavity 220. (Mirrors 211, 212 are not included in FIG. 2B for viewing clarity.) The mirrors 211, 212 can be implemented by reflective films coated on the outer surfaces of the wave plates 250 and 260. The gain medium 240 is formed by a birefringent material, as shown in FIGS. 2A and 2B. Examples of birefringent materials suitable for the gain medium 240 include Nd:$YVO_4$, and Nd:$GdVO_4$. The optical axis "c" of a birefringent gain medium 240 is parallel to the y axis. An example for the gain medium 240 is a-cut Nd:YVO4 crystal, available from Photop Technologies, with a 2% doping level for the $Nd^{3+}$. The gain medium can have dimensions of 1 mm×1 mm×0.9 mm. The end surfaces (that transmit the lasing light) of the Nd:YVO$_4$ crystal can be coated for anti-reflectance at the pumping and the lasing wavelengths (e.g. 808 nm and 1064 nm). The wave plate 250, the gain medium 240, and the wave plate 260 are sequentially positioned along the z axis. The gain medium 240 can be sandwiched between the wave plates 250 and 260. The gain medium 240 and the wave plates 250 and 260 can be bonded together by an optical glue to form a microchip.

The wave plate 250 has its fast axis "f" and slow axis "s" approximately at 45 degrees relative to the optical axis "c" of the gain medium 240 (i.e. the y axis). For example, the angle "$\theta_1$" between the fast axis and the optical axis "c" of the gain medium 240 can be between 30 and 60 degrees, or between 40 and 50 degrees. The wave plate 260 also has its fast axis "f" and slow axis "s" at 45 degrees relative to the optical axis "c" of the gain medium 240. The fast axis and the slow axis of the wave plate 260 can be respectively aligned to the slow axis and the fast axis of the wave plate 250. The fast axis and the slow axis of the wave plate 260 can be respectively aligned to the fast axis and the slow axis of the wave plate 250. The angle "$\theta_2$" between the fast axis and the optical axis "c" of the gain medium 240 can be between 30 and 60 degrees, or between 40 and 50 degrees. The wave plates 250 and 260 can be formed by quarts crystals having dimensions of 1 mm×1 mm×0.456 mm. The input surface of the wave plate 250 first QWP can be coated to have anti-reflectance (T=98.5%) for the pump light (e.g. at 808 nm) and high-reflectance (R=99.95%) for the lasing light (e.g. at 1064 nm). The back surface of the wave plate 250 is anti-reflectance coated for both the pump light and the lasing light. The output surface of the wave plate 260 is coated high-reflectance (R=95%) for the lasing light (e.g. at 1064 nm) to allow portions of the lasing light to exit from the laser cavity 220.

A pump light 270 is projected into the laser cavity 220 along the z axis. An example of a pump source is a laser diode SDL 1.2 W LD available from JDSU, which emits laser beam at 808 nm. The pump light 270 can be coupled into the mirror 211 by a mini lens with a focusing length of 2.6 mm (e.g. Photop D-lens). The pump laser diode, the coupling lens, the wave plates 250, 260, and the gain medium 240 can be mounted in an aluminum package 10 mm long and 9 mm in diameter. The mirror 211 can be a coating on the front surface of the wave plate 250, which allows a pump light 270 to be transmitted into the laser cavity 220 and substantially reflects lasing light back to inside the laser cavity 220.

The wave plate 250 is a double wave plate: it is a quarter wave plate at the lasing wavelength and a whole wave plate at the wavelength of pump light 270. Because the wave plate 250 is a whole wave plate at the pump light wavelength, the wave plate 250 does not affect the polarization of the pump light 270 before it enters the gain medium 240 in which the energy of the pump light 270 is consumed for producing a lasing light 280.

After the pump light 270 enters the gain medium 240, the lasing light 280 is generated by the gain medium 240 polarized along the y axis in response to the pump light 270. The birefringence of the gain medium 240 thus produces a substantially linearly polarized lasing light 280, which is an e-ray with a polarization direction P21 in the gain medium 240. For a gain medium made of Nd:YVO$_4$, the lasing wavelength can be 1064 nm.

The wave plate 260 is a quarter wave plate at the lasing wavelength, but is not required to be a whole wave plate for the pump light 270. Optionally, the wave plate 260 can be a whole wave plate at the wavelength of the pump light 270. The mirror 212 can be a reflective coating on the rear surface of the wave plate 260. The lasing light 280 is reflected by the mirrors 211, 212 to produce resonance in the laser cavity 220. A portion of the lasing light 280 can transmit through the mirror 212 to form an output laser light 285.

Referring to FIGS. 2B and 2C, after the lasing light 280 exits the gain medium 240, the wave plate 260 transfers the linearly polarized P21 (e-ray) to a circularly polarized light (P22 in FIG. 2B). After being reflected by the mirror 212, the wave plate 260 return circularly polarized light (P23) to a linearly polarized light having a polarization (P24 in FIG. 2C) orthogonal to P21 and to the optical axis of the birefringent gain medium 240. The lasing light 280 is thus an o-ray light in the gain medium 240 in the returning path along the backward direction. Next, the wave plate 250 transfers the linearly polarized P24 to another circularly polarized light (P25 in FIG. 2C), which turns into a circularly polarized light (P26 in FIG. 2B) in the next forward pass after being reflected by the mirror 211. The wave plate 250 again turns the circularly polarized lasing light P26 into a linearly polarized light having the same polarization direction (P21) as in the first forward pass.

In the laser cavity 220, there are both e-ray and o-ray with same frequency and intensity simultaneously and form a traveling-wave in the cavity. We will call this microchip laser, which can be referred to as "Orthogonal-polarization Traveling-wave Mode (OTM) laser". In the laser cavity 220, another traveling-wave propagating in opposite direction can also exist. Bidirectional propagating traveling-waves can interfere with each other and produce the standing-wave patterns of e-ray and o-ray in the laser cavity 220. Large birefringence brings the standing-wave patterns of e-ray and o-ray out of phase in the gain-medium 240 and the spatial hole burning effects produced by the standing waves of e-ray and o-ray compensate with each other, which relieves the overall spatial hole burning effects. We have theoretically shown and experimentally demonstrated that the SLM laser 200 is capable of suppressing the spatial hole-burning effect at greater than 25 times the threshold power. The SLM laser 200 can have high power of output (730 mw at 1.25 W pump power), high slope efficiencies (60%) and wide temperature range (30° C.) of single longitudinal mode operation.

Figure 3:
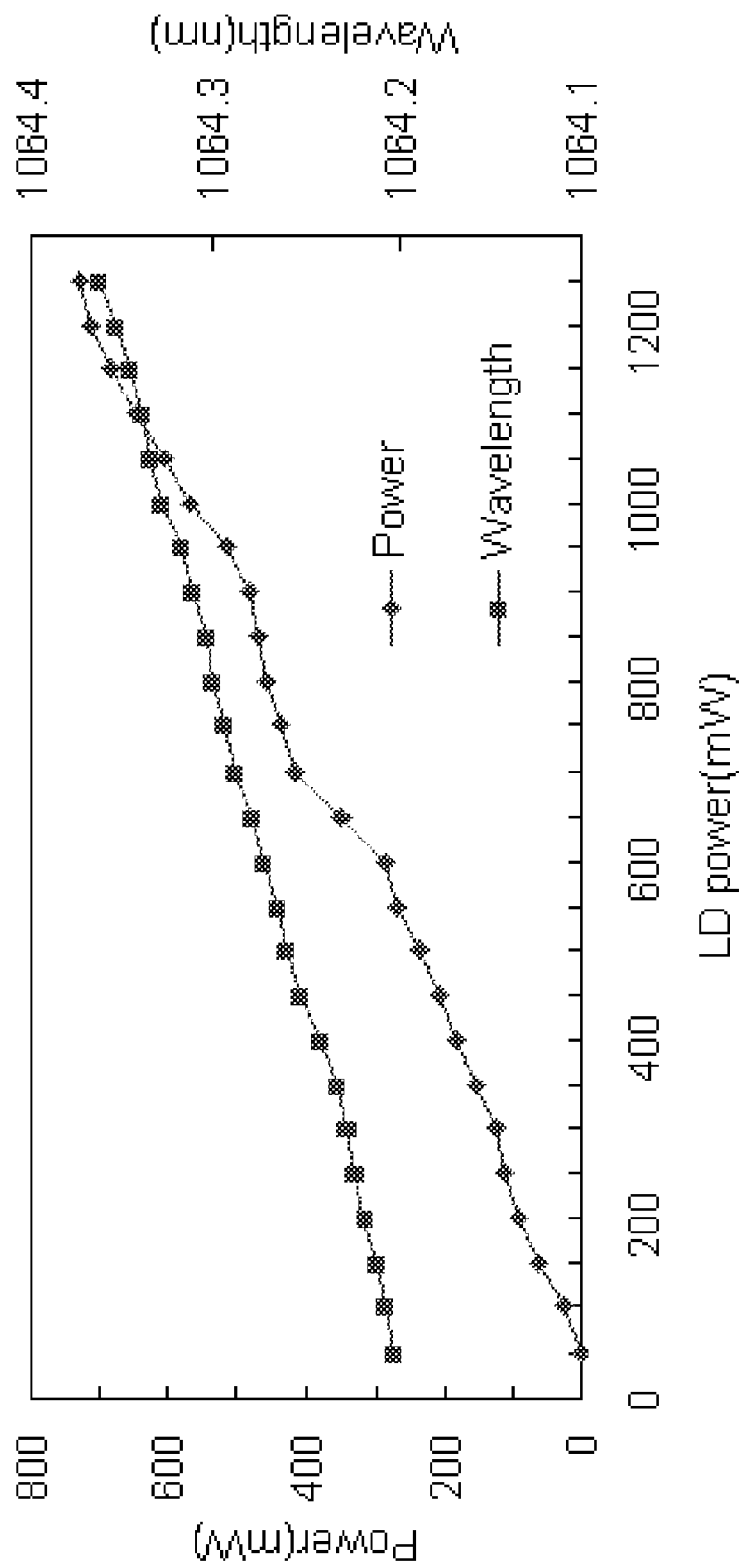
FIG. 3 is a plot showing the dependence of output laser power and output laser wavelength on pump power in the single longitudinal-mode laser in FIG. 2A.

The output of the SLM laser 200 was experimentally analyzed using an Optical Spectrum Analyzer (OSA, Ando AQ6317) at a wavelength resolution of 0.01 nm. The output power for lasers was measured by a power meter (Newport 1830C). The measurements were conducted in a room temperature environment (20° C.-30° C.). The output power and wavelength of single-longitudinal-mode operation of the OTM laser were measured as a function of the pump power as shown in FIG. 3. In the calculations of the threshold and slope efficiency we used the output power of laser diode as pump power instead of power absorbed by gain medium. FIG. 3 shows that the lasing threshold for the pump power is below 50 mW. The maximum single-mode output power was greater than 730 mW with a maximum pump power only 1250 mW. The output laser has a power more than 500 mW when the pump power is at 1000 mW. The measurement results show that OTM SLM laser can operate at 25 times above the threshold before the second mode reaches threshold. The wavelength variation of the output laser was within 0.3 nm in the full pump-power range. The slope efficiency of the output laser derived from the measurement is greater than 60%.

Figure 4:
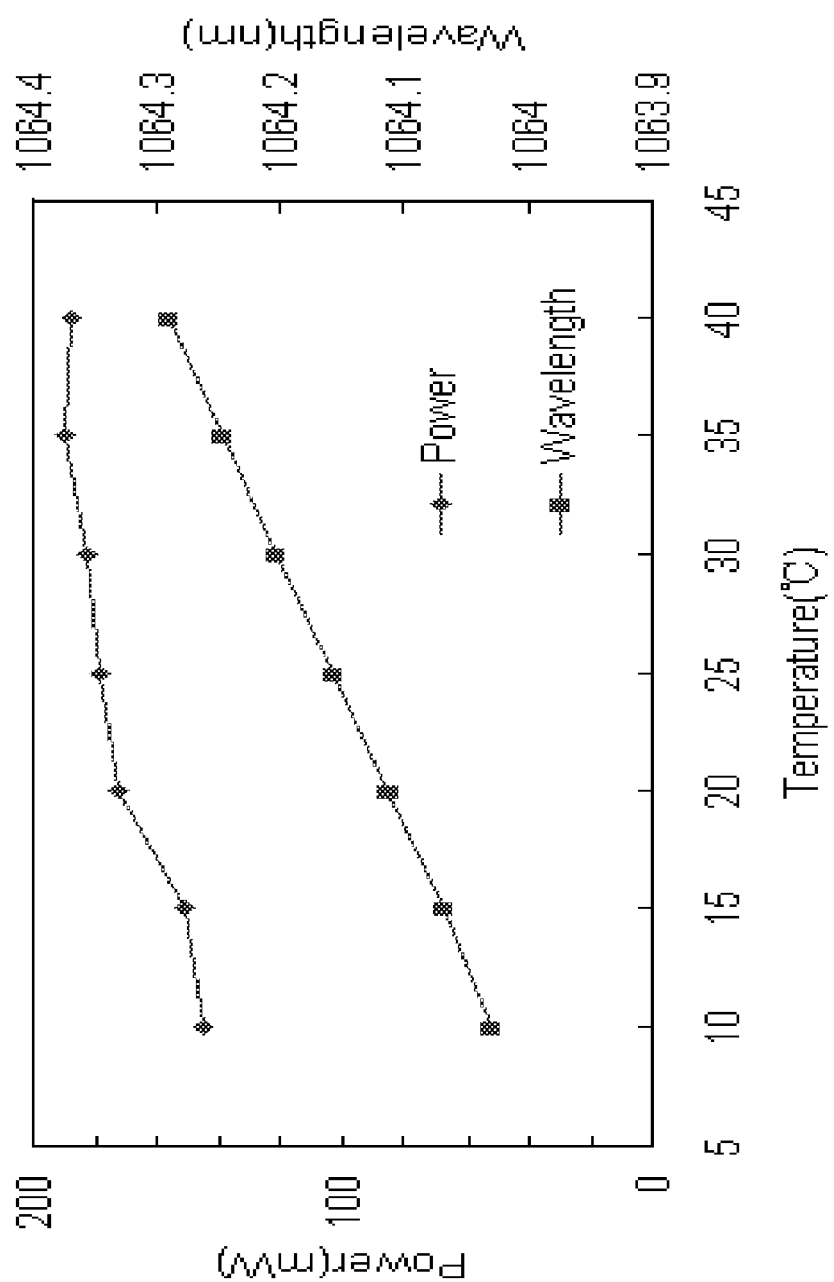
FIG. 4 is a plot showing the output laser power and output laser wavelength in a temperature range in the single longitudinal-mode laser in FIG. 2A.

The SLM laser 200 is also capable outputting single-mode laser in a wide range of temperature, as shown in FIG. 4. The OTM SLM laser can operate in a temperature range s greater than 30° C. at 300 mW pump power. The wavelength variation of the output laser beam is less than 0.3 nm over a temperature range from 10° C. to 40° C. The output laser was in a single transverse $TEM_{00}$ mode. M2 was measured to be better than 1.15. The polarizations of output laser were approximately linear polarizations oriented approximately at 45° relative to c-axis of Nd:YVO4 crystal. The extinction ratio can be as high as up to 390:1. In a test with 200 times turn on-offs, no mode-jumping or bistable phenomenon was observed.

The present patent application discloses improved high performance single longitudinal mode laser device. The disclosed SLM laser is compatible with birefringent gain medium materials, which allow the disclosed SLM laser to use a much wider selection of laser gain medium materials than conventional SLM laser devices. The disclosed SLM laser is based on orthogonal-polarization traveling mode, which differs from the standing-wave mode laser in some conventional SLM laser devices. The disclosed SLM laser can suppress spatial hole-burning effect at laser power greater than 25 times the threshold power, which is much bigger than some conventional SM laser device, as previously described. The disclosed SLM laser can provide single longitudinal mode operation with high output power and power efficiency (e.g. an output power of 730 mw at 1.25 W pump power), and high slope efficiencies (e.g. 60%) in a wide temperature range (e.g. 30° C.).

It should be understood that the described single longitudinal mode laser can be implemented in other configurations without deviating from the spirit of the present invention. For example, the disclosed SLM laser can include a non-linear medium for frequency conversion. The non-linear medium can generate a second lasing light in response to the first (i.e. fundamental) lasing light produced by the gain medium. The second lasing light can, for example, double the frequency of the first lasing light (e.g. from 1064 nm to 532 nm). The non-linear medium can be inserted between the gain medium and one of the wave plates in the laser cavity of the disclosed SLM. The non-linear medium can have a II-type phase match and have its fast axis parallel to c-axis of the gain medium. A second lasing light can be established in single longitudinal mode at higher lasing frequency. The disclosed SLM laser is also suitable for Q-switch applications. A saturateable absorber such as a Cr4+:YAG crystal can be inserted between the gain medium and one of the wave plates in the laser cavity of the disclosed SLM. The resulting Q-switched single-longitudinal-mode (SLM) laser can have high-peak output power and smooth Q-switched pulses with well-resolved laser spectra, which are suitable for a broad range of applications.

What is claimed is:

1. A single longitudinal-mode laser, comprising:
a first mirror;
a second mirror, wherein the first mirror and the second mirror define a laser cavity therein, wherein the first mirror is configured to allow a pump light at a pumping wavelength to enter the laser cavity, wherein there is no linear polarizer positioned within the laser cavity;
a birefringent gain medium configured to generate a lasing light at a lasing wavelength along a light propagation direction in response to the pump light, wherein the birefringent gain medium has an optical axis substantially perpendicular to the light propagation direction, wherein the second mirror is configured to output at least a portion of the lasing light out of the laser cavity to form an output laser;
a first wave plate positioned between the first mirror and the birefringent gain medium, wherein the first wave plate is a quarter wave plate at the lasing wavelength and a whole wave plate at the pumping wavelength; and
a second wave plate positioned between the birefringent gain medium and the second mirror, wherein the first wave plat and the second wave plate in part produce a single longitudinal mode in the lasing light.

2. The single longitudinal-mode laser of claim 1, wherein the first wave plate has a first fast axis substantially perpendicular to the light propagation direction, wherein the first fast axis is at a first angle relative to the optical axis of the birefringent gain medium, wherein the first angle is between 30 and 60 degrees.

3. The single longitudinal-mode laser of claim 2, wherein the first wave plate has a first slow axis substantially perpendicular to the first fast axis and the light propagation direction.

4. The single longitudinal-mode laser of claim 2, wherein the second wave plate has a second fast axis substantially perpendicular to the light propagation direction and to the first fast axis.

5. The single longitudinal-mode laser of claim 4, wherein the second wave plate has a second slow axis substantially perpendicular to the second fast axis and the light propagation direction.

6. The single longitudinal-mode laser of claim 1, wherein the birefringent gain medium is configured to generate a first linearly polarized lasing light having a first linear polarization parallel to the optical axis of the birefringent gain medium, wherein the second wave plate is configured to produce a first circularly polarized lasing light, wherein the second mirror is configured to reflect the first circularly polarized lasing light to produce a second circularly polarized lasing light, wherein the second wave plate is configured to produce a second linearly polarized lasing light having a second linear polarization perpendicular to the optical axis of the birefringent gain medium in response to the second circularly polarized lasing light.

7. The single longitudinal-mode laser of claim 1, wherein the birefringent gain medium, the first wave plate and the second wave plate are configured to produce the lasing light in a single longitudinal mode when the pump light has a pump power between a threshold pump power and a maximum pump power that is at least 20 times of the threshold pump power.

8. The single longitudinal-mode laser of claim 7, wherein the threshold pump power is below 50 mW, and wherein the maximum pump power is more than 1000 mW.

9. The single longitudinal-mode laser of claim 7, wherein the output laser has a power more than 500 mW when the pump power is at about 1000 mW.

10. The single longitudinal-mode laser of claim 7, wherein the wavelength of the output laser has a variation smaller than 0.3 nm when the pump power varies from the threshold pump power and the maximum pump power.

11. The single longitudinal-mode laser of claim 7, wherein the slope efficiency of the output laser is more than 60%.

12. The single longitudinal-mode laser of claim 1, wherein the birefringent gain medium, the first wave plate and the second wave plate are configured to produce the lasing light in a single longitudinal mode thereby producing the output laser having a wavelength variation less than 0.3 nm over a temperature range from 10° C. to 40° C.

13. A single longitudinal-mode laser, comprising:
a first mirror;
a second mirror, wherein the first mirror and the second mirror define a laser cavity therein, wherein the first mirror is configured to allow a pump light at a pumping wavelength to enter the laser cavity, wherein there is no linear polarizer positioned within the laser cavity;

a birefringent gain medium configured to generate a lasing light at a lasing wavelength along a light propagation direction in response to the pump light, wherein the birefringent gain medium has an optical axis substantially perpendicular to the light propagation direction, wherein the second mirror is configured to output at least a portion of the lasing light out of the laser cavity to form an output laser;

a first wave plate positioned between the first mirror and the birefringent gain medium, wherein the first wave plate has a first fast axis substantially perpendicular to the light propagation direction, wherein the first fast axis is at a first angle relative to the optical axis of the birefringent gain medium, wherein the first angle is between 30 and 60 degrees; and a second wave plate positioned between the birefringent gain medium and the second mirror, wherein the second wave plate has a second fast axis substantially perpendicular to the light propagation direction and to the first fast axis, wherein the first wave plat and the second wave plate in part produce a single longitudinal mode in the lasing light.

14. The single longitudinal-mode laser of claim 13, wherein the birefringent gain medium is configured to generate a first linearly polarized lasing light having a first linear polarization parallel to the optical axis of the birefringent gain medium, wherein the second wave plate is configured to produce a first circularly polarized lasing light, wherein the second mirror is configured to reflect the first circularly polarized lasing light to produce a second circularly polarized lasing light, wherein the second wave plate is configured to produce a second linearly polarized lasing light having a second linear polarization perpendicular to the optical axis of the birefringent gain medium in response to the second circularly polarized lasing light.

15. The single longitudinal-mode laser of claim 13, wherein the first wave plate is a quarter wave plate at the lasing wavelength and a whole wave plate at the pumping wavelength, wherein the first wave plate is a quarter wave plate at the lasing wavelength.

16. The single longitudinal-mode laser of claim 13, wherein the first wave plate has a first slow axis substantially perpendicular to the first fast axis and the light propagation direction, wherein the second wave plate has a second slow axis substantially perpendicular to the second fast axis and the light propagation direction.

17. The single longitudinal-mode laser of claim 13, wherein the birefringent gain medium, the first wave plate and the second wave plate are configured to produce the lasing light in a single longitudinal mode when the pump light has a pump power between a threshold pump power and a maximum pump power that is at least 20 times of the threshold pump power.

18. The single longitudinal-mode laser of claim 17, wherein the threshold pump power is below 50 mW, and wherein the maximum pump power is more than 1000 mW.

19. The single longitudinal-mode laser of claim 17, wherein the output laser has a power more than 500 mW when the pump power is at about 1000 mW.

20. The single longitudinal-mode laser of claim 17, wherein the wavelength of the output laser has a variation smaller than 0.3 nm when the pump power varies from the threshold pump power and the maximum pump power.

21. The single longitudinal-mode laser of claim 13, wherein the birefringent gain medium, the first wave plate and the second wave plate are configured to produce the lasing light in a single longitudinal mode thereby producing the output laser having a wavelength variation less than 0.3 nm over a temperature range from 10° C. to 40° C.

22. A single longitudinal-mode laser, comprising:

a first mirror;

a second mirror, wherein the first mirror and the second mirror define a laser cavity therein, wherein the first mirror is configured to allow a pump light at a pumping wavelength to enter the laser cavity;

a first wave plate positioned between the first mirror and the birefringent gain medium, wherein the first wave plate is a quarter wave plate at a lasing wavelength and a whole wave plate at the pumping wavelength, wherein the first wave plate has a first fast axis substantially perpendicular to the light propagation direction, wherein the first fast axis is at a first angle relative to the optical axis of the birefringent gain medium, wherein the first angle is between 30 and 60 degrees;

a birefringent gain medium configured to generate a first linearly polarized lasing light at the lasing wavelength along a light propagation direction in response to the pump light, wherein the birefringent gain medium has an optical axis substantially perpendicular to the light propagation direction, wherein the first linearly polarized lasing light has a first linear polarization parallel to the optical axis of the birefringent gain medium; and a second wave plate positioned between the birefringent gain medium and the second mirror, wherein the second wave plate has a second fast axis substantially perpendicular to the light propagation direction and to the first fast axis, wherein the second wave plate is configured to produce a first circularly polarized lasing light, wherein the second mirror is configured to reflect the first circularly polarized lasing light to produce a second circularly polarized lasing light and to output at least a portion of the first circularly polarized lasing light out of the laser cavity to form an output laser, wherein the second wave plate is configured to produce a second linearly polarized lasing light having a second linear polarization perpendicular to the optical axis of the birefringent gain medium in response to the second circularly polarized lasing light.

23. The single longitudinal-mode laser of claim 22, wherein there is no linear polarizer positioned within the laser cavity.

* * * * *